United States Patent
Stollmaier et al.

(10) Patent No.: US 8,362,142 B2
(45) Date of Patent: Jan. 29, 2013

(54) POLYURETHANE DISPERSIONS AND COATINGS PRODUCED THEREFROM

(75) Inventors: Friederike Stollmaier, Rheunmunster (DE); Bindushree Radhakrishnan, Lake Jackson, TX (US); Stefano Carlo E Grassini, Pfaffikon (CH); Jean-Luc Roser, Thalwil (CH); Kenneth W. Skaggs, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 128 days.

(21) Appl. No.: 12/746,954

(22) PCT Filed: Dec. 9, 2008

(86) PCT No.: PCT/US2008/086006
§ 371 (c)(1),
(2), (4) Date: Jun. 9, 2010

(87) PCT Pub. No.: WO2009/085587
PCT Pub. Date: Jul. 9, 2009

(65) Prior Publication Data
US 2010/0273939 A1  Oct. 28, 2010

Related U.S. Application Data

(60) Provisional application No. 61/016,612, filed on Dec. 26, 2007.

(51) Int. Cl.
| | |
|---|---|
| B05D 3/02 | (2006.01) |
| B32B 27/00 | (2006.01) |
| B32B 27/40 | (2006.01) |
| C08G 18/00 | (2006.01) |
| C08G 18/08 | (2006.01) |
| C08G 18/10 | (2006.01) |
| C08G 18/28 | (2006.01) |
| C08G 18/30 | (2006.01) |
| C08J 3/00 | (2006.01) |
| C08K 3/20 | (2006.01) |
| C08L 75/00 | (2006.01) |

(52) U.S. Cl. .................. 524/590; 427/372.2; 427/385.5; 428/423.1; 524/589; 524/591; 524/839; 524/840; 528/44; 528/59; 528/60; 528/65; 528/66; 528/77; 528/81; 528/85

(58) Field of Classification Search .................. 524/589, 524/590, 591, 839, 840; 427/372.2, 385.5; 428/423.1; 528/44, 59, 60, 65, 66, 77, 81, 528/85
See application file for complete search history.

(56) References Cited

U.S. PATENT DOCUMENTS

| | | |
|---|---|---|
| 2,968,575 A | 1/1961 | Mallonee |
| 3,021,309 A | 2/1962 | Cox et al. |
| 3,021,317 A | 2/1962 | Cox et al. |
| 3,169,945 A | 2/1965 | Hostettler et al. |
| 3,248,417 A | 4/1966 | Hoffmann et al. |
| 3,412,054 A | 11/1968 | Milligan et al. |
| 3,870,684 A | 3/1975 | Witt et al. |
| 3,905,929 A | 9/1975 | Noll et al. |
| 3,920,598 A | 11/1975 | Reiff et al. |
| 3,923,713 A | 12/1975 | Hermann |
| 3,948,837 A | 4/1976 | Schmitt et al. |
| 4,016,122 A | 4/1977 | Matsuda et al. |
| 4,046,729 A | 9/1977 | Scriven et al. |
| 4,092,286 A | 5/1978 | Noll et al. |
| 4,147,679 A | 4/1979 | Scriven et al. |
| 4,203,883 A | 5/1980 | Hangauer, Jr. |
| 4,237,264 A | 12/1980 | Noll et al. |
| 4,408,008 A | 10/1983 | Markusch |
| 4,554,308 A | 11/1985 | Russiello |
| 4,652,466 A | 3/1987 | Thoma et al. |
| 4,745,151 A | 5/1988 | Noll et al. |
| 4,956,438 A | 9/1990 | Ruetman et al. |
| 5,130,404 A | 7/1992 | Freeland |
| 5,418,261 A | 5/1995 | Helsemans et al. |
| 5,539,021 A | 7/1996 | Pate et al. |
| 5,569,706 A | 10/1996 | Jacobs et al. |
| 5,688,842 A | 11/1997 | Pate, III et al. |
| 5,959,027 A | 9/1999 | Jakubowski et al. |
| 6,231,926 B1 | 5/2001 | Ronzani et al. |
| 7,199,207 B2 | 4/2007 | Gruenewaelder et al. |
| 2001/0014715 A1 | 8/2001 | Blum et al. |
| 2004/0204559 A1 | 10/2004 | Melchiors et al. |
| 2004/0210026 A1 | 10/2004 | Mayer et al. |
| 2005/0004367 A1 | 1/2005 | Du et al. |

FOREIGN PATENT DOCUMENTS

| | | |
|---|---|---|
| DE | 2808503 A1 | 8/1978 |
| GB | 1078202 A | 8/1967 |
| GB | 1128568 A | 9/1968 |
| GB | 2386898 A | 10/2003 |
| WO | WO-98/41552 A1 | 9/1998 |
| WO | WO-2005/023947 A1 | 3/2005 |

OTHER PUBLICATIONS

International Search Report (PCT/US2008/086006).
Saunders, et al., Polyethers, Polyurethanes, 1962, pp. 32-42, vol. I, Interscience Publishers, New York.
Saunders, et al., Polyesters, Polyurethanes, 1962, pp. 44-54, vol. I, Interscience Publishers, New York.
Saunders, et al., Polyols, Polyurethanes, 1964, pp. 5-6, vol. II, Interscience Publishers, New York.
Saunders, et al., Polyols, Polyurethanes, 1964, pp. 198-199, vol. II, Interscience Publishers, New York.
Saunders, Polyurethanes, Organic Polymer Chemistry, 1973, pp. 323-325, Chapman and Hall, London.
Buist, J.M., Introduction, Developments in Polyurethanes, 1978, pp. 1-76, vol. I, Applied Science Publishers.
Dreyfuss, P. et al., The Nature and Influence of Gegenions in Tetrahydrofuran Polymerization, Adv. Chem, 1969, pp. 335-349, Series 91.

Primary Examiner — Patrick Niland

(57) ABSTRACT

The present invention discloses polyurethane dispersions based on aliphatic isocyanates which form hard coatings wherein the coatings also have good solvent resistant properties. The enhanced properties of the coatings are achieved by including from 1 to 8 weight percent of a high functional polyol in the polyol formulation for producing the dispersions.

6 Claims, No Drawings

POLYURETHANE DISPERSIONS AND COATINGS PRODUCED THEREFROM

FIELD OF THE INVENTION

This invention relates to solvent free polyurethane dispersions and compositions which form films at ambient temperatures and provide for coatings with high hardness and good solvent resistant properties.

BACKGROUND OF THE INVENTION

Coatings for hard and soft surfaces are important for the protection of the surface and can add to the aesthetic appeal to natural surfaces, such as wood. Concerns about emissions of volatile organic compounds (VOCs) along with stricter legislation on VOCs have led to an increased focus on the use of water based systems for coating applications. Water based systems offer the additional advantages as they are easier to use than solvent based coatings.

Polyurethane dispersions (PUDs) may be used for a wide range of commercial applications, such as coatings for textile fabrics, plastics, wood, glass fibers and metals. The production of polyurethane-urea dispersions is known, as exemplified in U.S. Pat. Nos. 4,237,264; 4,408,008; 5,569,706; U.S. Patent Publications 2004204559; 2005004367; GB Patent Publication 2386898 and WO Publication 2005023947.

When aromatic isocyanates are used in the formation of coatings, such coatings tend to yellow over time when exposed to sunlight or UV radiation. To give coatings with improved non-yellowing characteristics, aliphatic isocyanates are used. While giving improved non-yellowing characteristics, coatings based on aliphatic isocyanates generally have reduced hardness and reduced solvent resistance as compared to polyurethane coatings based on an aromatic isocyanate.

It as an object of the present invention to provide aqueous PUDs for surface coatings based on aliphatic isocyanates which are capable of forming a film at ambient temperature without the need for a coalescing solvent. It is a further object of the present invention to provide an aliphatic isocyanate based PUD which when applied to a surface gives a hard, solvent resistant coating.

SUMMARY OF THE INVENTION

In one aspect, the present invention is a solvent free-aqueous polyurethane dispersion which forms a film at ambient temperature wherein the polyurethane solids in the dispersion produce a hardness of equal to or greater than 90 Persoz seconds measured 1 day or 7 days after application In a further embodiment, the present inventions is an aqueous polyurethane dispersion containing polyurethane solids and a non-aqueous, organic solvent content of less than 5 weight percent wherein the polyurethane solids are obtained from a polyurethane prepolymer prepared by reacting
  a) a polyol comprising
    ai) from 92 to 99 wt % of a polyol or polyol blend having a mean average equivalent weight of 150 to 600 and a nominal average functionality of from 1.5 to 2.9; and
    aii) from 1 to 8 wt % of at least one polyol having a nominal functionality of 4 to 8; and an equivalent weight of 100 to 170;
  (b) at least one aliphatic polyisocyanate;
  (c) optionally additional stabilizers; and
  (d) optionally chain extenders wherein the prepolymer has an isocyanate (NCO) content of from 2 to 20 wt %.

In a further aspect, the present invention is a coating prepared from the above-described PUDs.

In a further aspect, the present invention is an isocyanate terminated prepolymer comprising
  a) a polyol having
    ai) from 92 to 99 wt % of a polyol or polyol blend having a mean average equivalent weight of 150 to 600 and a nominal average functionality of from 1.5 to 2.9; and
    aii) from 1 to 8 wt % of at least one polyol having a nominal functionality of 4 to 8; and an equivalent weight of 100 to 170; and
  (b) at least one aliphatic polyisocyanate;
wherein the prepolymer has a free isocyanate content of from 2 to 20 wt %.

It was unexpectedly found the inclusion of a high functional polyol in the formulation with an aliphatic isocyanate gives produces films having high hardness and good solvent resistance properties, as measured by resistance to acetone and isopropanol in water, as is generally associated with the use of aromatic isocyanates. The present invention allows the use of aliphatic isocyanate to avoid the yellowing associated with coatings containing aromatic isocyanates yet retain hardness and solvent resistance associated with the use of aromatic isocyanates.

DETAILED DESCRIPTION

The polyurethane prepolymers in making the PUDs include a polyisocyanate component and an isocyanate reactive component also known as an active hydrogen containing material or polyol. The term polyurethane includes polymers containing linkages known to those in the art associated with the formation of a polyurethane, such as urea or polyureas, allophonate, biuret, etc.

The PUDs of the present invention form a film at ambient temperatures without the need for coalescing agents. Outdoor ambient temperatures include from 5 to 45° C. and for indoor applications where the temperature is generally from 15 to 25° C. The dispersion can be applied at higher temperatures, however; this would increase the cost for use of such PUDs. The coatings based on PUDs of the present invention have a hardness of 90 seconds or greater based on the Persoz test, measured 24 hours and 7 days after application. Preferably the coatings have a hardness of 95 seconds or greater and more preferably have a hardness of 100 seconds or greater. In some embodiments, the coatings have Persoz hardness of 124 seconds or greater.

The polyisocyanate component of the prepolymer formulations of the present invention can be advantageously selected from aliphatic polyisocyanates, modified aliphatic polyisocyanates, and mixtures thereof. Examples of aliphatic isocyanate compounds include, 1,6-hexamethylene-diisocyanate (HDI); isophorone diisocyanate (IPDI); 2,4- and 2,6-hexahydrotoluene-diisocyanate; 4,4'-, 2,2'- and 2,4'-dicyclohexylmethanediisocyanate (H12MDI); tetramethyl xylene diisocyanate, norbornane diisocyanate; 1,3- and 1,4-(bisisocyanatomethyl)cyclohexane (including cis- or trans-isomers thereof); tetramethylene-1,4-diisocyanate (TMXDI); cyclohexane 1,4-diisocyanate; 4,4'-dicyclohexylmethane diisocyanate; xylene diisocyanate; 1,12-dodecane diisocyanate; 2,2,4-trimethylhexamethaylene diisocyanate; and mixtures thereof.

In one preferred embodiment, the isocyanate component is 1,6-hexamethylene-diisocyanate; isophorone diisocyanate, 1,3-, 1,4-(bisisocyanatomethyl)cyclohexane or a mixture thereof.

Also advantageously used for the polyisocyanate component of the formulations of the present invention are the so-called modified multifunctional isocyanates, that is, products which are obtained through chemical reactions of the above diisocyanates and/or polyisocyanates. Exemplary are polyisocyanates containing esters, ureas, biurets, allophanates, carbodiimides and/or uretonimines; isocyanurate and/or urethane group containing diisocyanates or polyisocyanates.

The isocyanate reactive component, referred to herein as a polyol, comprises a low functionality component ai) and a high functionality component aii). As used herein a "polyol" is a compound containing two or more active hydrogen groups that can reaction with an isocyanate group to form a urea group, a thiourea group, or a urethane group as illustrated by the general reaction:

where X is O, S, NH, or N, and R and R' are connecting groups which may be aliphatic, aromatic, or cycloaliphatic, or combinations thereof.

Active hydrogen containing compounds most commonly used in polyurethane production are those compounds having at least two hydroxyl groups or amine groups. For the present invention, in one embodiment the active hydrogen groups are hydroxyl. Representatives of suitable polyols are generally known and are described in such publications as High Polymers, Vol. XVI, "Polyurethanes, Chemistry and Technology" by Saunders and Frisch, Interscience Publishers, New York, Vol. I, pp. 32-42, 44-54 (1962) and Vol. II, pp. 5-6, 198-199 (1964); Organic Polymer Chemistry by K. J. Saunders, Chapman and Hall, London, pp. 323-325 (1973); and Developments in Polyurethanes, Vol. I, J. M. Burst, ed., Applied Science Publishers, pp. 1-76 (1978). Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols.

The polyether polyols include those obtained by the alkoxylation of suitable starting molecules with an alkylene oxide, such as ethylene (EO), propylene (PO), butylene oxide (BO), or a mixture thereof. Examples of initiator molecules for producing the ai) include water, ammonia, aniline or polyhydric alcohols such as dihydric alcohols having a molecular weight of 62-399, especially the alkane polyols such as ethylene glycol, propylene glycol, hexamethylene diol, glycerol, trimethylol propane or trimethylol ethane, or the low molecular weight alcohols containing ether groups such as diethylene glycol, triethylene glycol, dipropylene glycol, tripropylene glycol or butylene glycols. Preferred are initiators containing two reactive functional groups, i.e. the dihydric alcohols.

Preferred are poly(propylene oxide) polyols and poly(oxypropylene-oxyethylene) polyols is used. These polyols are conventional materials prepared by conventional methods. Catalysis for this polymerization can be either anionic or cationic, with catalysts such as KOH, CsOH, boron trifluoride, or a double cyanide complex (DMC) catalyst such as zinc hexacyanocobaltate or quaternary phosphazenium compound. In the case of alkaline catalysts, these alkaline catalysts are preferably removed from the polyol at the end of production by a proper finishing step, such as coalescence, magnesium silicate separation or acid neutralization.

Other polyether polyols include the poly(tetramethylene oxide) polyols, also known as poly(oxytetramethylene) glycol, that are commercially available as diols. These polyols are prepared from the cationic ring-opening of tetrahydrofuran and termination with water as described in Dreyfuss, P. and M. P. Dreyfuss, Adv. Chem. Series, 91, 335 (1969).

Illustrative polyester polyols may be prepared from organic dicarboxylic acids having from 2 to 12 carbon atoms, preferably aromatic dicarboxylic acids having from 8 to 12 carbon atoms, and polyhydric alcohols, preferably diols, having from 2 to 12, preferably from 2 to 8 and more preferably 2 to 6 carbon atoms. Examples of dicarboxylic acids are succinic acid, glutaric acid, adipic acid, suberic acid, azelaic acid, sebacic acid, decanedicarboxylic acid, malonic acid, pimelic acid, 2-methyl-1,6-hexanoic acid, dodecanedioic acid, maleic acid and fumaric acid. Preferred aromatic dicarboxylic acids are phthalic acid, isophthalic acid, terephthalic acid and isomers of naphthalene-dicarboxylic acids. Such acids may be used individually or as mixtures. Examples of dihydric and polyhydric alcohols include ethanediol, diethylene glycol, triethylene glycol, 1,2- and 1,3-propanediol, dipropylene glycol, 1,4-butanediol and other butanediols, 1,5-pentanediol and other pentanediols, 1,6-hexanediol, 1,10-decanediol, glycerol, and trimethylolpropane. Illustrative of the polyester polyols are poly(hexanediol adipate), poly(butylene glycol adipate), poly(ethylene glycol adipate), poly(diethylene glycol adipate), poly(hexanediol oxalate), poly(ethylene glycol sebecate), and the like.

While the polyester polyols can be prepared from substantially pure reactants materials, more complex ingredients can be used, such as the side-stream, waste or scrap residues from the manufacture of phtalic acid, terephtalic acid, dimethyl terephtalate, polyethylene terephtalate and the like. Other source is the recycled PET (polyethelene terephtalate). After transesterification or esterification the reaction products can optionally be reacted with an alkylene oxide.

Another class of polyesters which may be used are polylactone polyols. Such polyols are prepared by the reaction of a lactone monomer; illustrative of which is δ-valerolactone, ε-caprolactone, ε-methyl-ε-caprolactone, ξ-enantholactone, and the like; with an initiator that has active hydrogen-containing groups; illustrative of which is ethylene glycol, diethylene glycol, propanediols, 1,4-butanediol, 1,6-hexanediol, trimethylolpropane, and the like. The production of such polyols is known in the art; see, for example, U.S. Pat. Nos. 3,169,945, 3,248,417, 3,021,309 and 3,021,317. The preferred lactone polyols are the di-, tri-, and tetra-hydroxyl functional ε-caprolactone polyols known as polycaprolactone polyols.

Polycarbonate containing hydroxyl groups include those known per se such as the products obtained from the reaction of diols such as propanediol-(1,3), butanediols-(1,4), pentanediols-(1,5) and/or hexanediol-(1,6), diethylene glycol, triethylene glycol or tetraethylene glycol with diarylcarbonates, for example diphenylcarbonate or phosgene.

For component ai), a single polyol or a blend of polyols may be used. The polyol or polyol blend will generally a mean average equivalent weight of 150 to 600. In a further embodiment, component ai) has a mean equivalent weight of at least 175. In another embodiment, ai) has a mean equivalent weight of at least 200. Generally ai) will have a mean equivalent weight of less than 575 and in a further embodiment, ai) will have a mean equivalent weight of less than 550. The nominal functionality of ai) will generally be at least 1.5 and in a further embodiment at least 1.8. The nominal functionality of ai) will generally be 2.9 or less. In a further embodiment, the nominal functionality of ai) will be less than 2.4. In one preferred embodiment, ai) is comprised of one or more diols. When using predominately a diol, the functionality may be less than 2 based on the presence of some monol components. Similarly the functionality can be greater than 2 based on the additional of higher functional material.

While various polyols can be blended to obtain the specified functionality and equivalent weight, is preferred when a blend of polyols is used, such blend contain less than 10% by weight of polyols having a molecular weight of 1,500 or greater. Preferably such a blend would contain less than 5% of polyols having a molecular weight of 1500 or greater.

Polyol ai) will generally comprise 90 wt % or greater of the combination of ai) and aii). In a further embodiment ai) will comprise 92 wt % greater of the total of ai) and aii). In another embodiment, ai) comprises 96 wt % or greater of the total of polyol component a). In yet another embodiment, ai) comprises 98 wt % or greater of the total of polyol component a). Polyol aii)

The polyol aii) for use in the present invention has a functionality of at least 4 and is generally from 4 to 8. In one embodiment, polyol aii) contains at least one polyol having a functionality of 5 or greater.

In one embodiment, polyol aii) is a polyether polyol. Such polyether polyols are produced as per the process described above for ai) except the initiator has a functionality of 4 or greater. Examples of such initiators include, pentaerythritol, xylitol, arabitol, sorbitol, sucrose, mannitol and combinations thereof.

The equivalent weight of polyols aii) will generally be at least 100 and in a further embodiment at least 105. The equivalent weight of polyol aii) will generally be less than 170 and in a further embodiment less than 160.

The amount of polyol aii) in polyol a) is generally at least 1 wt % and in a further embodiment at least 2 wt %. The amount of polyol aii) in polyol a) can be up to 4 wt % and in a further embodiment up to 6 wt %. In some embodiments, the polyol aii) can comprise up to 8 wt % of polyol a).

The polyether polyols of aii) include poly(oxypropylene) glycols, capped with ethylene oxide. These polyols also include poly(oxypropyleneoxyethylene)polyols. The oxyethylene content should preferably comprise less than about 80 weight percent of the total polyol weight and more preferably less than about 40 weight percent. The ethylene oxide, when used, can be incorporated in any way along the polymer chain, for example, as internal blocks, terminal blocks, or randomly distributed blocks, or any combination thereof.

The polyol aii) can be capped with from 5 to 25 percent ethylene oxide, and more preferably, from 10 to 15 percent ethylene oxide.

While various polyols can be blended to obtain the specified functionality and equivalent weight of aii), when a blend is used, it is preferred less than 10 wt % of the polyols having a functionality of 4 or greater have an equivalent weight outside the specified range. Preferably such a blend would contain less than 5% of polyols having an equivalent weight outside the range specified above.

In preparing the prepolymers, ratio of the isocyanate reactive groups to isocyanate is chosen to give a prepolymer having a free isocyanate (NCO) content of from 2 wt % up to 20 wt %. In a further embodiment, the prepolymer contains at least 5 wt % free NCO, and in a further embodiment at least 8 wt % NCO. In some embodiments, it is preferred the wt % of free NCO is 18 or less and in further embodiments, 13 wt % or less.

The prepolymers of the present invention can be prepared in any way known to those of ordinary skill in the art of preparing polyurethane prepolymers. Preferably the polyisocyanate and polyol component are brought together and heated under reaction conditions sufficient to prepare a polyurethane prepolymer. The stoichiometry of the prepolymer formulations of the present invention is such that the polyisocyanate is present in excess.

The prepolymer can be made in the presence of a solvent and the solvent removed before or after the production of the dispersion. If a solvent is present, is preferred the solvent is removed to give an aqueous dispersion which is essentially free of solvent. That is, the dispersion contains less than 5 percent, preferable less than 2.5 percent and more preferably less than 1 percent by weight of solvent. In a preferred embodiment the prepolymers is made in the absence of a solvent. When a solvent is used, examples of solvents which are not reactive with the isocyanate include ketones, such as acetone and butanone; ethers such as tetrahydrofuran, dioxane and dimethoxyethane, ether esters, such as methoxypropyl acetate; (cyclic) amide and ureas, such as dimethylformamide, dimethylacetamide, N,N'-dimethyl-2,5-dizapentanone; N-methylpyrrolidone; and capped glycol ethers, such as PROGLYDE™ DMM (trademark of The Dow Chemical Company). These solvents may be added at any stage of the prepolymer preparation.

Processes for making dispersions are well known in the art. The dispersions can be done by a batch process or by a continuous process. If done by a batch process, preferably, the dispersion in done by an inverse phase process wherein a small amount of water, including a small amount of anionic surfactant, is first added to a continuous prepolymer phase and mixed and then more water is added with mixing until the phase inverts.

When dispersions of the present invention are prepared by means of a continuous process, preferably they are prepared by means of a high internal phase ratio (HIPR) process. Such processes are known and are disclosed in, for Example, U.S. Pat. No. 5,539,021 to Pate, et al., and WO 98/41552 A1 to Jakubowski, et al. When prepared by either method, the resulting dispersion should have a particle size sufficient to make the dispersion stable. The dispersions of the present invention will have a particle size of from 0.9 to 0.05, preferably from 0.5 to 0.07 and even more preferably, from 0.4 to 0.10 microns. Most preferably, the particle size of the dispersions of the present invention is about 0.15 microns.

For PUD's the dispersion may be internally or externally stabilized or both. An internally stabilized polyurethane dispersion is one that is stabilized through the incorporation of ionically or nonionically hydrophilic pendant groups within the polyurethane of the particles dispersed in the liquid medium. Examples of nonionic internally stabilized polyurethane dispersions are described by U.S. Pat. Nos. 3,905,929 and 3,920,598. Ionic internally stabilized polyurethane dispersions are well known and are described in col. 5, lines 4-68 and col. 6, lines 1 and 2 of U.S. Pat. No. 6,231,926. Typically, dihydroxyalkylcarboxylic acids such as described by U.S. Pat. No. 3,412,054 are used to make anionic internally stabilized polyurethane dispersions. A common monomer used to make an anionic internally stabilized polyurethane dispersion is dimethylolpropionic acid (DMPA).

An externally stabilized polyurethane dispersion is one that substantially fails to have an ionic or nonionic hydrophilic pendant groups and thus requires the addition of a surfactant to stabilize the polyurethane dispersion. Examples of externally stabilized polyurethane dispersions are described in U.S. Pat. Nos. 2,968,575; 5,539,021; 5,688,842 and 5,959,027.

In one preferred embodiment of the present invention, the polyurethane dispersion is comprised of a nonionic polyurethane and an external stabilizing surfactant. A nonionic polyurethane is one that does not contain a hydrophilic ionizable group. A hydrophilic ionizable group is one that is readily ionized in water such as DMPA (dimethylolproprionic acid). Examples of other ionizable groups include anionic groups such as sulfonic acids and alkali metal salts thereof. Examples of cationic groups include ammonium salts reaction of a tertiary amine and strong mineral acids such as phosphoric acid, sulfuric acid, hydrohalic acids or strong organic acids or by reaction with suitable quartinizing agents such as C1-C6 alkyl halides or benzyl halides (e.g., Br or Cl).

Surfactants can be useful for preparing a stable dispersion of the present invention, and/or for preparing a stable froth. Surfactants useful for preparing a stable dispersion in the practice of the present invention can be cationic surfactants, anionic surfactants, zwitterionic or a non-ionic surfactants. Examples of anionic surfactants include sulfonates, carboxylates, and phosphates. Examples of cationic surfactants include quaternary amines. Examples of non-ionic surfactants include block copolymers containing ethylene oxide and silicone surfactants, such as ethoxylated alcohol, ethoxylated fatty acid, sorbitan derivative, lanolin derivative, ethoxylated nonyl phenol or a alkoxylated polysiloxane. Furthermore, the surfactants can be either external surfactants or internal surfactants. External surfactants are surfactants which do not become chemically reacted into the polymer during dispersion preparation. Examples of external surfactants useful herein include salts of dodecyl benzene sulfonic acid, and lauryl sulfonic acid salt. Internal surfactants are surfactants which do become chemically reacted into the polymer during dispersion preparation. An example of an internal surfactant useful herein includes anionic molecules such as 2,2-dimethylol propionic acid and dihydroxy and amino sulfate and sulfonate their salts, quaternized ammonium salts, and nonionic hydrophilic species, such polyethylene oxide monols and polyols. These hydrophilic ionic and nonionic moieties may be built into on the polymer backbone. A surfactant can be included in a formulation of the present invention in an amount ranging from 0.01 to 8 parts per 100 parts by weight of polyurethane component. When a polyethylene oxide polyol is used as a surfactant, this polyol is considered part of the polyol mixture when calculating the polyisocyanate to polyol ratio.

A monol can be included in the prepolymer formulation, the monol is preferably a mono-functional hydrophilic polyether. The monols can be incorporated into the prepolymer as a means of modifying the properties of the latex and improving ease of emulsion formation. When present, the monol is present in amount of from 0.1 to 5 weight percent of the prepolymer formulation, preferably 3 weight percent or less of the prepolymer formulation.

It is preferred the prepolymers are extended with a chain extender. Any chain extender known to be useful to those of ordinary skill in the art of preparing polyurethanes can be used with the present invention. Such chain extenders typically have a molecular weight of 30 to 500 and have at least two active hydrogen containing groups. Polyamines are a preferred class of chain extenders. Other materials, particularly water, can function to extend chain length and so are chain extenders for purposes of the present invention. It is particularly preferred that the chain extender is water or a mixture of water and an amine such as, for example, aminated polypropylene glycols such as Jeffamine D-400 and others from Huntsman Chemical Company, amino ethyl piperazine, 2-methyl piperazine, 1,5-diamino-3-methyl-pentane, isophorone diamine, ethylene diamine, diamino butane, hexamethylene diamine, tetramethylene tetraamine, aminoethyl propyl trimethoxy silane, diethylene triamine, triethylene tetramine, triethylene pentamine, ethanol amine, lysine in any of its stereoisomeric forms and salts thereof, hexane diamine, hydrazine and piperazine. In the practice of the present invention, the chain extender is often used as solution of chain extender in water.

While, the chain extender of the present invention can be water, preferably it is a diamine. To the extent that a chain extender other than water is used in the formulations of the present invention, preferably it is used at an amount such that the equivalents of active hydrogens of the chain extender is equal to or greater than 60% of the isocyanate equivalents represented by the prepolymer NCO content. Even more preferably, the chain extender is present at an amount such that the equivalents of active hydrogens of the chain extender is from 60 to 95 percent of the isocyanate equivalents represented by the prepolymer NCO content.

The dispersions will generally have a solids content of from 30 to 60 weight percent. Films will not necessarily be prepared from dispersions having this level of solids. While the dispersion themselves will be stored and shipped at a high solids content as possible to minimize storage volume and shipping costs, the dispersion can be diluted prior to final use. Thus in some embodiments it is preferred to have a solids content of 40 wt % or greater.

The dispersions may contain further auxiliaries and additives, such as, for example, inorganic and organic pigments, dyes, leveling agents, viscosity regulators, natural and synthetic waxes, anti-foaming agents, matting agents and the like.

The dispersions of the present invention are useful in coatings for surfaces, particularly as wood coatings or as a component to adjust the hardness of leather coatings. The PUDs may be applied by conventional methods such as painting, spraying, flow-coating, transfer-coating, roller coating, brushing, dipping spreading, curtain coating etc. The dispersions can be puddled or pooled on a substrate and then spread over the substrate using a brush or other spreading means. Spraying includes atomizing the PUD and ejecting the atomized material onto the substrate. Furthermore, the dispersion of the present invention can be blended with other latexes and polymers.

The PUDs are preferably applied at ambient temperatures as described above. Drying of the products obtained by the various applications of the PUDs can be carried out at room temperature or at elevated temperature.

The following examples are provided to illustrate the present invention. The examples are not intended to limit the scope of the present invention and should not be so interpreted. All percentages are by weight unless otherwise noted.

EXAMPLES

Raw Materials

IPDI is isophorone diisocyanate available from Fluka.
P 400 is a polypropylene glycol with a molecular weight of 400.
Tertitol L61 is 2000 molecular weight polyoxypropylene diol capped with 12 percent ethylene oxide; available from The Dow Chemical Company.

PEG 1000 is a polyethylene glycol with a molecular weight of 1000.
MPEG 950 is methoxypolyethyleneglycol with a molecular weight of 950.
Voranol RN482 is a sorbitol initiated all PO polyol having a molecular weight of 821 available from The Dow Chemical Company.
Voranol 520 is sucrose/glycerine initiated all PO polyol having a functionality of 5.2 and molecular weight of about 569.
Voranol 360 is sucrose/glycerine initiated all PO polyol having a functionality of functionality of 4.9 and a molecular weight of 764.
Voranol 370 is sucrose/glycerine initiated all PO polyol having a functionality of functionality of 6.9 and a molecular weight of 1050.
Unoxol 3,4-diol is 1,3-/1,4-cyclohexane dimethanol having a 1,3-/1,4-isomer ratio of approximately 58:42, available from The Dow Chemical Company.

Preparation of the Prepolymers

The prepolymers are prepared as follows: Known amounts of the polyols are charged to a 500 ml glass jar, which is subsequently heated to 70° C. To this mixture of polyether polyols is added IPDI which is also heated to 70° C. An amount of ca. 80 ppm benzoyl chloride is added to neutralize the residual base in the polyols. The mixture is stirred under a nitrogen atmosphere and placed into an oven at 85° C. After half an hour in the oven, the prepolymer is again mixed and then left in the oven overnight to undergo reaction, removed and then cooled to room temperature.

Preparation of the Dispersions

The dispersions are prepared by adding 3 parts (dry based on 100 parts prepolymer) of a sodium lauryl sulphate surfactant with a concentration of 14 wt % to the prepolymer using a high shear stirrer at 3000 rpm. Additional water is added until a phase inversion is observed. Then the chain extender ethylene diamine is then added to the dispersion with additional water to reach the desired final concentration.

Minimum Film Formation Temperature

The minimum film formation temperature (MFFT) is determined on a Thermostair II from Coesfeld. A film with a wet thickness of 200 μm is drawn down on the heating plate with a temperature gradient from 0 to 30° C. and dried. The temperature transition from a film with cracks to a homogeneous film is recorded as MFFT.

Solvent Resistance

The solvent resistance is measured by applying a 400 μm wet coating thickness on wood panels and drying the coating for 2 days at ambient temperature and 45-50% relative humidity. Then a cotton pad of ca 2 g is saturated with the corresponding solvent, placed on top of the coating and covered with a watch glass. After 1 hour application, the cotton pad is removed and the visual appearance of the coating is inspected after 1 hour and also after overnight recovery. The visual appearance is rated according to a 1-5 notation as follows:

| Rating for wood coating |
|---|
| 1: totally white or destroyed |
| 2: different coloration and gloss |
| 3: loss in gloss and color (quite visible) |
| 4: little loss in gloss (visible only on some angles) |
| 5: no influence on the coating |

Table 1 Making of the Prepolymers.
Prepolymers are prepared based on the compositions given in Table 1.

TABLE 1

| | IPDI | P400 | Unoxol | Tergitol L61 | PEG 1000 | MPEG 950 | Voranol 482 | Voranol 520 | Voranol 360 | Voranol 370 |
|---|---|---|---|---|---|---|---|---|---|---|
| Comp. Examples | | | | | | | | | | |
| C1 | 50 | 45 | 0 | | 3 | 2 | 0 | 0 | 0 | 0 |
| C2 | 46 | 46 | 3 | | 3 | 2 | 0 | 0 | 0 | 0 |
| C3 | 48 | 44 | 3 | | 3 | 2 | 0 | 0 | 0 | 0 |
| C4 | 50 | 42 | 3 | | 3 | 2 | 0 | 0 | 0 | 0 |
| Examples | | | | | | | | | | |
| Ex1 | 50 | 42 | | | 3 | 2 | 3 | | | |
| Ex2 | 50 | 39 | | | 3 | 2 | 6 | | | |
| Ex3 | 52 | 40 | | | 3 | 2 | 3 | | | |
| Ex4 | 52 | 37 | | | 3 | 2 | 6 | | | |
| Ex5 | 51 | 39.5 | | | 3 | 2 | 4.5 | | | |
| Ex6 | 52 | 37 | | | 3 | 2 | | 3 | | |
| Ex7 | 52 | 32 | | 5 | 3 | 2 | | 3 | | |
| Ex8 | 52 | 27 | | 10 | 3 | 2 | | 3 | | |
| Ex9 | 52 | 37 | | | | 2 | | | 3 | |
| Ex10 | 52 | 32 | | 5 | | 2 | | | 3 | |
| Ex11 | 52 | 27 | | 10 | | 2 | | | 3 | |
| Ex12 | 52 | 37 | | | | 2 | | | | 3 |
| Ex13 | 52 | 27 | | 10 | | 2 | | | | 3 |

The resistance of the produced coatings to isopropanol in water and acetone are given in Table 2.

TABLE 2

| | IPA/Water Resistance Evaluation after | | Acetone Resistance Evaluation after | |
|---|---|---|---|---|
| | 1 hr | 1 night | 1 hr | 1 night |
| Comp. Examples | | | | |
| C1 | 1 | 1 | 1 | 1 |
| C2 | 1 | 1 | 1 | 1 |
| C3 | 1 | 1 | 1 | 1 |
| C4 | 1 | 1 | 1 | 1 |

TABLE 2-continued

|  | IPA/Water Resistance Evaluation after | | Acetone Resistance Evaluation after | |
|---|---|---|---|---|
|  | 1 hr | 1 night | 1 hr | 1 night |
| Examples | | | | |
| Ex1 | 4 | 4.5 | 3 | 3 |
| Ex2 | 5 | 5 | 1 | 1 |
| Ex3 | 5 | 5 | 1 | 1 |
| Ex4 | 4 | 4.5 | 2.5 | 3 |
| Ex5 | 4 | 4.5 | 1 | 1 |
| Ex6 | 2.5 | 4 | 3.5 | 4 |
| Ex7 | 3 | 4.5 | 4 | 4.5 |
| Ex8 | 3.5 | 4.5 | 4 | 5 |
| Ex9 | 3 | 4 | 3 | 4 |
| Ex10 | 3 | 4 | 2.5 | 4 |
| Ex11 | 3 | 4 | 4 | 4.5 |
| Ex12 | 3.5 | 4 | 3.5 | 4 |
| Ex13 | 3.5 | 4 | 4 | 4.5 |

The results show the dispersions prepared with a high functional polyol generally display improved resistance, particular to the isopropanol/water solvent as compared to the controls. For many of the formulation, there is also an improvement in acetone resistance.

Results on of the Persoz hardness of the produced films is shown in Table 3.

TABLE 3

|  | MFFT [deg C.] | Persoz Hardness [sec] 1 d/7 d |
|---|---|---|
| Comp. Examples | | |
| C1 | 15 | 103/152 |
| C2 | 6 | 46/112 |
| C3 | 6 | 65/133 |
| C4 | 9 | 81/167 |
| Examples | | |
| Ex 1 | 11 | 90/169 |
| Ex 2 | 14 | 107/177 |
| Ex 3 | 14 | 125/176 |
| Ex 4 | 18 | 124/198 |
| Ex 5 | 14 | 91/169 |
| Ex 6 | 16 | 235/245 |
| Ex 7 | 16 | 209/228 |
| Ex 8 | 16 | 196/211 |
| Ex 9 | 17 | 217/238 |
| Ex 10 | 17 | 201-222 |
| Ex 11 | 17 | 185/203 |
| Ex 12 | 12 | 224/236 |
| Ex 13 | 16 | 192/207 |

The results show all dispersion were film forming at room temperature without the need to add an organic solvent. It also shows the hardness is not decreased by adding the multifunctional polyols, and in most cases an improvement is seen.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. An aqueous polyurethane dispersion containing polyurethane solids and a non-aqueous, organic solvent content of less than 5 weight percent wherein the polyurethane solids are obtained from a polyurethane prepolymer prepared by reacting
  a) a polyol comprising
    ai) from 92 to 99 wt % of a polyol or polyol blend having a mean average equivalent weight of 150 to 600 and a nominal average functionality of from 1.5 to 2.9 and
    aii) from 1 to 8 wt % of at least one polyol having a nominal functionality of 5 to 8; and an equivalent weight of 100 to 170;
  (b) at least one aliphatic polyisocyanate;
  (c) optionally additional stabilizers; and
  (d) optionally chain extenders
  wherein the prepolymer has an isocyanate (NCO) content of from 2 to 20 wt %, and wherein the solids content of the dispersion is from 30 to 60 weight percent.

2. The dispersion of claim 1 wherein the isocyanate is 1,6-hexamethylene-diisocyanate (HDI); isophorone diisocyanate (IPDI); 2,4- and 2,6-hexahydrotoluene-diisocyanate; 4,4'-, 2,2'- and 2,4'-dicyclohexylmethanediisocyanate (H12MDI); tetramethyl xylene diisocyanate, norbornane diisocyanate; 1,3- and 1,4-(bisisocyanatomethyl)cyclohexane (including cis- or trans-isomers thereof); tetramethylene-1,4-diisocyanate (TMXDI); cyclohexane 1,4-diisocyanate; 4,4'-dicyclohexylmethane diisocyanate; xylene diisocyanate; 1,12-dodecane diisocyanate; 2,2,4-trimethylhexamethaylene diisocyanate; or a mixture thereof.

3. The dispersion of claim 1 wherein polyol ai) has a mean average equivalent weight of 75 to 500.

4. The dispersion of claim 1 wherein the dispersion is made in a continuous process.

5. A hard coating on a surface comprising the polyurethane dispersion of claim 1.

6. An isocyanate terminated prepolymer comprising
  a) a polyol having
    ai) from 92 to 99 wt % of a polyol or polyol blend having a mean average equivalent weight of 150 to 600 and a nominal average functionality of from 1.5 to 2.9; and
    aii) from 1 to 8 wt % of at least one polyol having a nominal functionality of 5 to 8; and an equivalent weight of 100 to 170; and
  (b) at least one aliphatic polyisocyanate;
  wherein the prepolymer has a free isocyanate content of from 2 to 20 wt %.

* * * * *